United States Patent Office 2,706,698
Patented Apr. 19, 1955

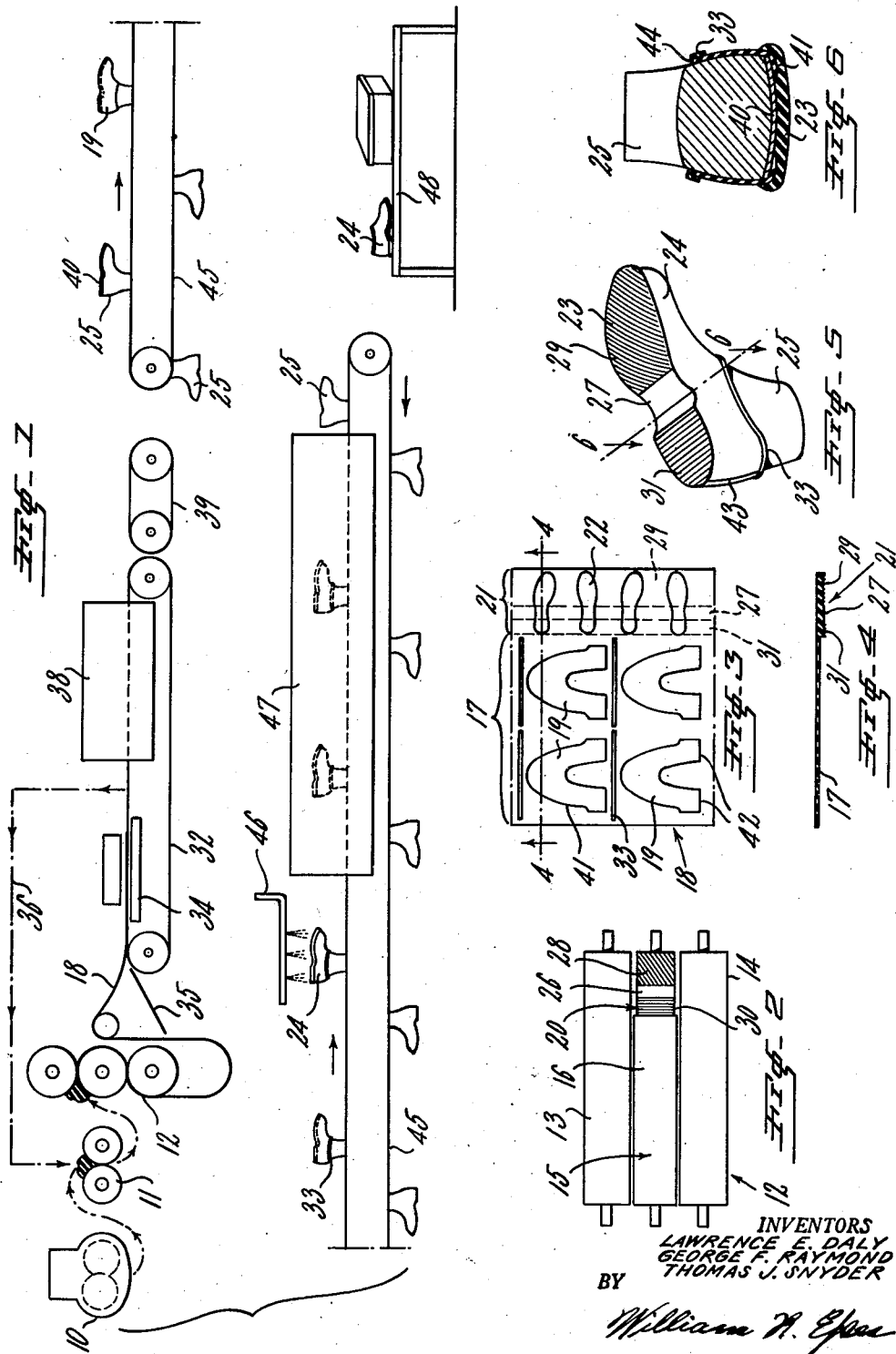

2,706,698

METHOD OF MANUFACTURING FOOTWEAR FROM NATURALLY TACKY PRE-CURED RUBBER

Lawrence E. Daly and George F. Raymond, Mishawaka, Ind., and Thomas J. Snyder, Edwardsburg, Mich., assignors to United States Rubber Company, New York, N. Y., a corporation of New Jersey Application October 17, 1951, Serial No. 251,792

3 Claims. (Cl. 154—116)

This invention relates to an improved continuous method of manufacturing rubber footwear, in which the shoe upper is made from milled and calendered sheet rubber composition, which is free from fabric reinforcement and is partially vulcanized before being built into a shoe on a last to prevent the upper from being distorted due to plastic flow during final vulcanization on the last.

Heretofore rubber footwear having such unreinforced or unlined uppers have been made by the conventional method, in which the footwear parts have been cut out of raw unvulcanized flat sheet rubber stock and adhered together on a last by the natural tack of the rubber, and then vulcanized in the open atmosphere of an autoclave in the usual manner. In such process, difficulties were encountered in preventing the unsupported portion of the upper from sagging away from the last, and thereby becoming distorted due to its plastic flow resulting from the softening of the rubber during its vulcanization. In order to minimize the number of defective shoes resulting from the distortion of the upper, it was necessary to use relatively stiff, or low viscosity rubber stocks, which had to be carefully controlled. Such control was obtained by using rubber stocks in which all of the components were broken down to substantially the same degree, and this necessitated the use of fresh rubber stocks on the rubber mill, and eliminated the use of scrap from cut out parts, either for reworking as such on the mill, or for mixing with fresh stock on the mill. Furthermore by the use of the relatively stiff low viscosity stock, a stiffer and less elastic article of footwear was produced.

The present improved process utilizes the economical advantages of the prior conventional process in which the rubber parts are built into a shoe on a last, and vulcanized thereon without any external support, but it eliminates or substantially reduces the difficulties and disadvantages of the prior process referred to above. The sagging of the rubber upper on the last during its vulcanization is reduced to the extent that the production of defective articles of footwear is substantially eliminated by using an ultra accelerator in the sheet rubber stock and by partially vulcanizing the rubber footwear parts after they have been cut out of the sheet stock, but prior to assembling them on the last. The partial vulcanization or prevulcanization is carried out while the separate parts are supported on the top side of a surface, which prevents the rubber from flowing and being distorted by the heat. The prevulcanization is carried out to the extent required to eliminate the detrimental effect of the sagging of the rubber during its vulcanization on the last, but insufficient to cause the rubber to lose its natural tack required to initially adhere the parts together and produce a satisfactory vulcanized bond after the adhered parts have been vulcanized on the last.

Due to the prevulcanization of the rubber parts, less viscous and less homogeneously milled rubber stocks may be used in the manufacture of the footwear, with the result that scrap material cut from the footwear parts, and stocks having a wider range of viscosities may be utilized. Furthermore, footwear having rubber uppers without fabric linings and of improved elastic quality may be produced.

The foregoing and other advantages and details of the present process relating to this invention are described in reference to the accompanying drawings, in which:

Fig. 1 is a diagrammatic side elevational view of an apparatus, which illustrates the practice of the method relating to this invention;

Fig. 2 is a front elevational view of the set of calender rolls shown in Fig. 1, which may be utilized in calendering the sheet material from which the shoe parts are cut;

Fig. 3 is a plan view of the rubber sheet stock calendered by the rolls shown in Fig. 2, and having the impressions of the shoe parts cut therein by a die;

Fig. 4 is a cross-sectional view of the calendered stock shown in Fig. 3 taken on line 4—4 thereof;

Fig. 5 is an isometric view of the shoe made from the cut out parts, which have been built up on a last; and Fig. 6 is a cross-sectional view of the built up shoe and last taken on line 6—6 of Fig. 5.

The method relating to this invention may be practiced by the use of the apparatus illustrated diagrammatically in Fig. 1 of the drawings. Either natural or synthetic rubber compounds or blends thereof may be used in the method, and all of the components of such compounds, excepting sulfur, are preferably mixed first in a Banbury mixer 10. After the rubber compound has been suitably mixed in accordance with the conventional practice, it is transferred in batches from the Banbury mixer to a rubber mill 11, where it is mixed with the sulfur ingredient. After the compound has been worked to the required degree on the mill 11, it is transferred in batches therefrom to a three roll calender 12 having the rolls thereof shaped and arranged as shown in Fig. 2.

The top and bottom rolls 13 and 14 of the calender 12 are cylindrical and are of the same diameter throughout their length. The middle roll 15 is cylindrical, but it is provided with a large diameter along a portion 16 of its length for calendering the thin strip 17 of the calendered sheet 18 shown in Fig. 3, from which the blanks 19 of the uppers for the footwear are cut out. The strip 17 and the blanks 19 may vary in thickness, but for use in overshoes, the blanks 19 are preferably about 0.030 inch thick. The middle roll 15 has a reduced diameter for the remainder of its length and that portion 20 is adapted to calender the thicker strip 21 of the calendered sheet 18 from which the combination sole and heel blanks 22 are cut for forming the outsole and heel 23 of the rubber shoe 24, as shown on the last 25 in Fig. 5. The portion 20 of the roll 15 which shapes the strip 21 of the calendered sheet 17 is provided with a plain surface 26 for calendering the plain surface 27 of the shank strip of the sole and heel blank 22, and it is provided with an engraved surface 28 for calendering the engraved surface 29 of the sole strip, and it is also provided with an engraved surface 30 for calendering the heel strip 31 of the calendered sheet 18.

The calendered sheet 18, as shown in Fig. 1, is transferred from the calender 12 onto a conveyor 32, where the shoe parts comprising the upper blanks 19, trimming strip blank 33 and sole and heel blanks 22 are cut out by a conventional reciprocating press cutter 34. Preferably, cutting boards 35 are inserted between the calendered sheets 18 and the conveyor belt 32 as the calendered sheet 18 passes on to the conveyor. The shoe parts 19, 22 and 33 are cut out on the boards 35. After each board 35 with the parts thereon have passed through the cutting press 34, the scrap rubber stock around the cut out parts is separated therefrom and is sent back to the rubber mill 11, as indicated by the dot and dash line 36. The scrap material may be reused as such or reworked with fresh material from the Banbury mixer 10.

The cutting boards 35 with the shoe parts thereon passes through a pre-vulcanizing chamber 38, where the rubber composition is partially vulcanized to a critical point, which is that point where the vulcanization is sufficient to limit the plastic flow of the suspended rubber during its final vulcanization on the shoe last 25 to the extent that the sag of the rubber will not cause defective articles, but such prevulcanization is insufficient to cause the rubber parts to lose its natural tack to the extent that the parts cannot be adhered together on the last and form a strong vulcanized bond during its final vulcanization. Such critical point of prevulcanization may be determined by a test which will be hereinafter described. After the boards 35 with the shoe parts thereon have passed through the pre-vulcanizing chamber 38, they are transferred to a conveyor 39. The smooth or unembossed side of the shoe parts, which are then facing upwardly, and which goes next to the last is treated with an anti-adhesive material, such as soapstone or talc commonly used in the rubber industry for that purpose.

The parts are then taken from the boards 35 and are built up on a last 25 over an insole 40 (Fig. 6) in the usual manner. The insole 40 is preferably formed from a porous piece of fabric, which is lightly coated with a coating of rubber cement and dried to form a porous tacky insole. In building the shoe, the insole is placed on the last 25, and then a one piece upper part 19 is built up on the last around the insole by turning the bottom edges 41 of the upper over the top of insole 40, and joining the rear edges 42 of the upper part 19 to form the back seam 43 of the overshoe. The edges 41 of the upper are beveled, or skived with a hot knife in order to smooth out the surface to which the outsole 20 and heel 23 of the shoe is applied. The top trimming strip 33 is then adhered around the top opening 44 of the shoe. The talc on the rubber surface to be adhered together is removed before such surfaces are adhered together. The talc may be removed by wiping the surfaces with a cloth containing gasoline.

The building up operation takes place on a conveyor 45 which carries the lasts 25. After the shoes are built onto the lasts 25, they are sprayed with the usual varnish by a spraying apparatus 46 before they pass into the final curing chamber 47, in which the vulcanization of the rubber parts of the shoes is completed. After the shoes pass out from the chamber 47, they are stripped from the last 25, and may be inspected and boxed for shipment at the station 48.

In the event the calendered rubber sheet 18 from which the shoe parts are cut is made from natural rubber, the following ingredients may be used for making a satisfactory compound:

| Ingredients: | Parts by weight |
| --- | --- |
| Natural rubber | 100 |
| Calcium carbonate | 75 |
| Carbon black | 16 |
| Zinc oxide | 6 |
| Mineral rubber | 2.2 |
| Heptylated diphenylamine (antioxidant) | .5 |
| Sulfur | 2.7 |
| Dithiocarbamate (accelerator) | 2.7 |

In the event the calendered sheet 17 from which the shoe parts are cut is made from synthetic rubber, the following ingredients have been found to make a satisfactory compound:

| Ingredients: | Parts by weight |
| --- | --- |
| GR-S (a rubbery butadiene-styrene copolymer) | 100 |
| Zinc oxide | 5 |
| Sulfur | 2 |
| Indonex (aromatic petroleum derivative plasticizer) | 30 |
| Altax (benzothiazyl disulphide) | 1 |
| Diphenyl guanidine | 1 |
| Calcium carbonate | 75 |
| Carbon black | 10 |

In either the natural rubber compound, or the synthetic rubber compound set forth above, a minor portion of from five to twenty parts of a reinforcing resin, such as styrene-butadiene (85–15), styrene-indene (85–15), or cyclized natural rubber, may be substituted for an equal amount of the natural or synthetic rubber in the compounds set forth above. Incorporation of these resins improves the aging, abrasion, and flexing properties of the vulcanized composition, but has little or no effect on the adhesive or plastic flow (sag) properties of the stock. All such compositions are referred to herein as rubber compounds or rubber sheet material.

Where the above rubber compounds are used, it has been found that the critical degree of prevulcanization can be best controlled within the vulcanizing temperature range of from 150° to 225° F., and that the final vulcanizing temperature should be from about 260° F. to 320° F. with a time period of from 10 to 15 minutes. The following ultra accelerators may be used under the above conditions: zinc dithiocarbamates, copper dimethyl- dithiocarbamates, mercaptobenzothiazole, dimethyl and diethyl dithiocarbamates, tetramethyl and tetraethyl disulfides.

The critical degree of prevulcanization, or the time required to produce such prevulcanization at a selected temperature may be determined by the following test, the results of which are set forth in the Table I below, where a prevulcanizing temperature of 150° F. is used for example:

Table I

| Prevulcanizing Temperature, 150° F. | | | Final Vulcanizing time of 10 minutes at 290° F. | |
| --- | --- | --- | --- | --- |
| Col. 1 Pairs of Samples | | Col. 2 | Col. 3 | Col. 4 |
| Sample No. 1 | Sample No. 2 | Time in minutes for Samples No. 1 and No. 2 | Percent Plastic flow of Sample No. 1 | Strength of Vulcanized bond of Sample No. 2 |
| | | | | Lbs. |
| A | a | 4 | 54 | 25 |
| B | b | 6 | 8 | 24 |
| C | c | 8 | 7 | 23 |
| *D | d | 10 | 4 | 20 |
| *E | e | 12 | 0 | 14 |
| F | f | 14 | 0 | 8 |

*Indicates the samples having the required critical degree of prevulcanization.

The above results in Table I were obtained in a test which was carried out by cutting six pairs of calendered rubber strips from the upper strip 17 of the calendered sheet 18. Each of the strips were 10" long and 1" wide, and had a thickness of 0.030", the usual thickness of the shoe upper. One sample of each pair of samples in Table I is referred to as sample #1 and the other sample is referred to as sample #2. The samples #1 were marked with the capital letters A, B, C, D, E and F, and samples #2 were marked with the small letters a, b, c, d, e and f, as indicated in column 1 of Table I. The pairs of samples Aa, Bb, etc. were prevulcanized while supported on a flat surface for the different periods of time varying by two minutes as set forth in column 2 of the table. The prevulcanized samples #1 were then fastened at one end to a rod, and the strips were suspended vertically from the rod in a heated air oven for 10 minutes at 290° F. to complete the vulcanization. The percentage of plastic flow of each strip as indicated by the increase in length of each sample during the 10 minute period is recorded in column 3 of the table. The other prevulcanized samples #2 marked with the small letters were doubled back on themselves so that the doubled portions adjacent to the bend were adhered together under pressure, but the ends of the strips were not adhered together. The double strips were then heated for 10 minutes at 290° F. while lying flat on a support to complete their vulcanization. The cured samples were then tested for the strength of the vulcanized bond between their adhered double portions by pulling the unbonded ends of each sample away from each other in a direction perpendicular to their bonded surface to determine the amount of pull required to separate the joined areas of the doubled over portions. In the test the ends of the test pieces are pulled apart at the rate of two inches per minute and the bond is subjected to tension and not shear. The strength of the vulcanized bond of the samples #2 of each of the pairs of strips are recorded in column 4 of Table I.

In the manufacture of shoes under this process, the rubber parts are prevulcanized to a point where the plastic flow of the parts is reduced to a minimum consistent with the retention of sufficient natural tack to produce a satisfactory vulcanized bond between the parts during the completion of the vulcanization of the shoe. It has been found in the practice of this process that the strength of bond between the adhered rubber parts is satisfactory if the adhesive pull strength required to cause separation per linear inch of seam is 10 lbs., or greater, and the percent of plastic flow during final vulcanization is 4% or less. Therefore samples D and E have the critical degree of prevulcanization required for this process and shoe uppers made from the same batch as the samples will have the required critical degree of prevulcanization when vulcanized for 10 to 12 minutes at 150° F. If desired other prevulcanizing temperatures may be used and the period of time for the temperature may be determined as explained in reference to Table I above.

The anti-adhesive is preferably applied to the surface of the rubber parts after they have been prevulcanized, in order to prevent the migration or commingling of the anti-adhesive with the rubber composition during the period it is being prevulcanized and is soft. The anti-adhesive is thereby rendered most effective in preventing the rubber parts from adhering to the last. The anti-adhesive also permits the escape of the air from between the rubber and the last, which prevents blisters, or pockmarks from being formed on the surface of the shoe adjacent to the last. Anti-adhesives useful in this process are characterized by those which will not be absorbed into the rubber during the final vulcanization, and which will form an air permeable layer between the rubber and the last to permit the escape of trapped air in that area. It has been found that soapstone, or talc is very satisfactory in fulfilling the foregoing requirements.

The present method of manufacturing rubber footwear having unreinforced uppers is an improvement over the prior processes in respect to a number of points. As a result of the continuous process and the use of ultra accelerators, the total time of vulcanization, including the prevulcanization and the final vulcanization, is reduced from 2½ hours to one-half hour or less. There is also less waste of scrap rubber because it can be reworked and calendered in stock from which other shoe uppers may be made. Furthermore, as hereinbefore stated, there is a reduction in the number of defective finished footwear which heretofore resulted from the sag or plastic flow of the rubber during its vulcanization.

While the preferred form of this invention has been described herein more or less in detail, it will be understood that changes may be made in such details without departing from the spirit of the invention or the scope of the appended claims.

Having thus described our invention, what we claim and desire to protect by Letters Patent is:

1. Method of making rubber footwear having an upper made essentially of naturally tacky milled and calendered vulcanizable substantially flat sheet rubber footwear parts containing an ultra accelerator and exhibiting substantially more than 4% plastic flow during vulcanization while suspended, said method comprising the steps of partially vulcanizing said parts while substantially their entire areas are supported on the top side of a surface and until its plastic flow is reduced to a minimum consistent with the retention of sufficient natural tack to cause adherence of the parts and produce a satisfactory vulcanized bond between the parts in the built up article of rubber footwear, applying to at least one side of the partially vulcanized rubber parts an anti-adhesive which will not be absorbed into said rubber parts during its final vulcanization and which will form an air permeable layer on said rubber parts, removing said anti-adhesive from the surfaces of said parts to be joined, building such parts into an article of rubber footwear on a last by placing said rubber parts on the last with said anti-adhesive layer adjacent to said last to permit the escape of air between said rubber parts and said last and by adhesively joining the parts together with the use of the natural tack of the parts, heating the article of rubber footwear in an atmosphere having a unit pressure which is substantially equal on the inner and outer surfaces of the footwear while portions of said footwear are suspended from said last, and thereby completing the vulcanization before the heat of vulcanization causes any detrimental flow in the suspended portions of the rubber parts.

2. Method of making rubber footwear having an upper made essentially of naturally tacky milled and calendered vulcanizable rubber parts containing an ultra accelerator and exhibiting more than 4% plastic flow when suspended in temperatures of from 260° to 320° F. for 10 to 15 minutes, said method comprising the steps of partially vulcanizing said parts while they are supported on the top side of a surface, the partial vulcanization being sufficient to reduce the plastic flow of said rubber parts to an amount not greater than 4% when suspended in temperatures of from 260° to 320° F. for 10 to 15 minutes and insufficient to reduce the natural tack required to adhesively unite the parts, applying to the side of said parts which is to form the inside surface of the footwear a layer of anti-adhesive powder which will not be absorbed into the said rubber during final vulcanization and which will form an air permeable layer on said rubber parts, removing said anti-adhesive powder from the surfaces of said parts to be united building the parts into an article of footwear on a last by placing said rubber parts on the last with said layer of anti-adhesive powder adjacent to said last to permit the escape of air between said rubber parts and said last and adhesively joining the parts with the natural tack of the rubber, heating the article of rubber footwear to from 260° to 320° F. for 10 to 15 minutes while portions of the footwear are suspended from the last, and thereby completing the vulcanization of said rubber parts before the heat of vulcanization causes more than 4% plastic flow in the suspended parts.

3. Method of making rubber footwear having an upper made essentially of naturally tacky milled and calendered vulcanizable substantially flat footwear parts containing an ultra accelerator and exhibiting substantially more than 4% plastic flow when suspended and subjected to vulcanizing temperatures greater than 260° F. for more than 10 minutes, said method comprising the steps of partially vulcanizing said parts while they are supported on the top side of a surface, the partial vulcanization being sufficient to reduce the plastic flow to an amount not greater than 4% when suspended in temperatures from 260° F. to 320° F. for 10 to 15 minutes and insufficient to reduce the natural tack required to adhesively unite the parts and produce a vulcanized bond having an adhesive pull test strength of not less than 14 pounds per linear inch of seam, applying talc to the side of said parts which form the inside surface of the footwear, removing the talc from any surfaces to be adhesively united, building such parts into an article of footwear on a last by uniting the parts with the natural tack retained by the parts, and completing the vulcanization of the parts at temperatures between 260° and 320° F. in 10 to 15 minutes while the parts are supported entirely by the last.

References Cited in the file of this patent

UNITED STATES PATENTS

| | | |
|---|---|---|
| 983,819 | Gavin | Feb. 7, 1911 |
| 1,146,523 | Roberts | July 13, 1915 |
| 1,164,860 | Piper | Dec. 21, 1915 |
| 1,536,866 | Kamborian | May 5, 1925 |
| 2,129,607 | Schott | Sept. 6, 1938 |

FOREIGN PATENTS

| | | |
|---|---|---|
| 806,255 | France | Sept. 21, 1936 |